Patented Nov. 11, 1952

2,617,748

UNITED STATES PATENT OFFICE 2,617,748

POLYSTYRENE ARTICLE PROVIDED WITH A RAY FILTERING COATING

Johan Bjorksten, Chicago, Ill., and Luther L. Yaeger, Hammond, Ind., assignors to Nash-Kelvinator Corporation, Kenosha, Wis., a corporation of Maryland No Drawing. Application January 28, 1948, Serial No. 4,946

3 Claims. (Cl. 117—138.8)

This invention relates to protective treatment of polystyrene plastics, and more particularly to integrally bonded transparent coatings, containing ray filtering substances or substances having strong absorption bands in invisible regions of the spectrum.

The use of polystyrene-type resins for manufacture of molded or machined articles is widespread. These plastics are used in application such as windows, optical goods, automobile panels, and also in molded household articles. Polystyrene is eminently suitable for such purposes in regards to its structural properties, such as strength and resiliency. Its surface properties can be vastly improved, for example, by the procedures disclosed in the co-pending applications, Serial Nos. 730,192 now Patent #2,578,665; 730,193 now Patent #2,578,683 and 730,207 now Patent #2,578,770, filed February 21, 1947, of which this is a continuation in part. However, a remaining disadvantage of polystyrene is its tendency to yellow or darken when exposed to daylight or particularly to direct sunlight for extended periods of time.

A principal object of the present invention is to greatly reduce or even eliminate such progressive yellowing or darkening of polystyrene, on exposure to light. Other objects are polystyrene articles having an ultra-violet absorbent coating integrally bonded thereto. Other objects are polystyrene articles having selective light absorption in an invisible range of spectrum. Further objects will become apparent as the following detailed description proceeds.

In accordance with our invention, we apply to a polystyrene object a coating such as those described in the co-pending parent applications, or as disclosed below, such coating containing in addition from 3 to 50% of an ultra-violet screening agent compatible with said coating, and not affecting its ability to fuse with polystyrene so as to form an integrally bonded coating thereon. A preferred ultra-violet filtering substance for this purpose is phenyl salicylate and also usable are benzyl and menthyl salicylates.

Phenyl salicylate not only is a particularly effective screening agent, but is also highly compatible with the integrally bonded protective coatings contemplated. It has no tendency to cloud or precipitate even at extremely low temperatures.

The invention is illustrated by the following specific examples, which are given only to show several possible applications, but not to limit the invention in any manner. The parts of ingredients are given by weight.

Example I

| Ingredient | |
|---|---|
| Cellulose acetate butyrate (6% acetyl—48% butyryl content) | 7.8 |
| Methyl and ethyl methacrylate copolymer | 1.6 |
| Ethylene glycol monoethyl ether acetate | 3.3 |
| Diacetone alcohol | 19.4 |
| Methyl ether of ethylene glycol | 58.1 |
| Aromatic petroleum thinner, having distillation range 313–398° F., K. B. V. of 70 and mixed aniline pt. of 65° F. | 9.8 |

Phenyl salicylate then was added to this stock coating solution in the proportions listed in the left-hand column of the table below. The solutions were then applied to ¼" polystyrene panels by dipping and subsequent drying under infrared lamps at a surface temperature of 130° F.

The coated panels thus obtained were tested in regard to marring by the A. S. T. M. method D–673–44; for solvent resistance by wiping the solvents listed in the table over the surface, and for ultra-violet protection by exposure for 240 hours under a 250 watt G. E. ultra-violet lamp at a distance of 24 inches from the test panels. The results of these tests are tabulated below:

| Percent Phenyl Salicylate (Solids basis) | Mar Resistance (Unscreened coating as standard) | Solvent Resistance (Gasoline, toluol carbon tetrachloride) | Ultra-violet Protection |
|---|---|---|---|
| 0 | Percent 100 | Good | Poor—polystrene yellows in 2 days. |
| 5 | 100 | do | Slight screening. |
| 9.6 | 100 | Unchanged | Do. |
| 17.7 | 100 | do | Better protection. |
| 30 | 100 | Softened but no change in clarity. | Excellent—no yellowing after 8 days. |
| 46 | 95 | Slight haze | Do. |
| 50 | 93 | do | Do. |

The coatings obtained in this test increased the dimension of the polystyrene panels by .0002". With the only two exceptions stated, they were transparent and all of the coatings were integrally bonded and thus could not be detached by any mechanical means. The clear coatings did not cloud or haze even when exposed one hour to a temperature of −70° F.

*Example II*

| | Parts |
|---|---|
| Cellulose acetate butyrate (20% butyryl, 40% acetyl) | 9 |
| Benzyl salicylate | 1 |
| Diacetone alcohol | 30 |
| Methyl ether of ethylene glycol | 50 |
| Nitromethane | 10 |
| Ethylene glycol monoethyl ether acetate | 10 |

This composition was applied to polystyrene panels by dipping. Since the relative humidity was 50%, the panels were dried with the surrounding atmospheric conditions. After one hour it formed a clear coating integrally bonded to the base plastic.

*Example III*

| | Parts |
|---|---|
| Methyl-ethyl methacrylate copolymer | 18 |
| Menthyl salicylate | 2 |
| Ethylene glycol monomethyl ether | 50 |
| Ethylene glycol monoethyl ether acetate | 20 |
| Ethyl lactate | 10 |
| Diacetone alcohol | 40 |
| Toluol | 15 |

This was applied by flowing onto polystyrene sheets and dried in a ventilated oven at 40° C. for ½ hour. The resulting coating adhered to form a transparent protective coating.

*Example IV*

| | Parts |
|---|---|
| Cellulose acetate hydrogen phthalate | 19 |
| Penyl salicylate | 1 |
| Amyl acetates, mixed isomeric | 12 |
| Methyl ethyl ketone | 20 |
| Ethylene glycol monomethyl ether | 90 |
| Ethylene glycol monoethyl ether | 35 |
| Ethyl lactate | 16 |

This mixture was sprayed onto polystyrene and dried with an infra-red lamp placed so as to give an ambient temperature of 30–40° C. around the pieces of plastic.

*Example V*

| | Parts |
|---|---|
| Allyl starch | 9 |
| Phenyl salicylate | 1 |
| Soluble cobalt (naphthenate) | 0.02 |
| Toluol | 30 |
| Iso-butanol | 5 |
| Iso-propanol | 50 |

Polystyrene panels were dipped into this coating, dried at room conditions for 5 minutes and then baked in an oven at 65° C. for 14 hours. The resulting film had a high luster and possessed excellent mar and solvent resistance.

*Example VI*

| | Parts |
|---|---|
| Allyl sucrose | 19 |
| Menthyl salicylate | 1 |
| Cobalt (as octoate) | 0.05 |
| Toluol | 30 |
| Brutanol, normal | 5 |
| Diacetone alcohol | 40 |

Panels of polystyrene were coated by dipping into this composition. After air-drying for 10 minutes they were hardened by heating in a forced circulation oven for 12 hours. The resulting coating was extremely hard with a high degree of clarity and surface gloss.

*Example VII*

| | Parts |
|---|---|
| Allyl starch | 10 |
| Phenyl salicylate | 0.2 |
| Menthyl salicylate | 0.2 |
| Benzyl salicylate | 0.2 |
| Toluol | 15 |
| Iso-butanol | 2 |
| Ethylene glycol monomethyl ether | 30 |

This formulation was sprayed onto polystyrene, dried at 30° C. for 5 minutes and then baked at 60° C. for 30 hours. Polymerization occurred as in the allyl coatings with soluble cobalt but at a slower rate.

It is seen from the examples that this invention is capable of considerable variation. By the use of phenyl salicylate and its analogues, it is possible to prepare coating solutions which will greatly reduce or even eliminate the yellowing tendency of the polystyrene type plastic (that is, plastics preponderantly based on styrene products) when exposed to light, and still form an integrally bonded transparent film on this plastic.

Phenyl salicylate is a preferred ingredient for this purpose, but menthyl salicylate, and benzyl salicylate may also be employed in compositions suitable for preparing integrally bonded coatings on polystyrene type resins with which they are compatible.

For this purpose we generally employ them in a percentage range between 5 and 50% of the solids present in the coating.

While reference was made in the examples to certain specific plastics as the materials employed in the integrally bonded coatings, we could equally well have used any of the other plastic combinations disclosed and claimed in the co-pending applications referred to above, of which this is a continuation in part. Generally, we may use as the base plastic for the coating, for example, mixed cellulose esters, preferably, though not necessarily, containing at least 8% acetyl, preferably, through not necessarily in admixture with a compatible resin selected from the group consisting of polymers of esters of acrylic, methacrylic, chloro acrylic and crotonic acids, co-polymers and mixtures thereof, or we may use plastics of this latter group alone; further, we may use cellulose hydrogen phthalate, or other aromatic cellulose derivative film formers having at least one free carboxyl group; further we may use as the base film forming ethers, such as allyl ethers or alkyl allyl ethers, of carbohydrates, such as, for example, starch and saccharides, such as sucrose.

As solvents for these materials, we prefer to use the preponderantly alcoholic, relatively high boiling solvent combinations disclosed and claimed in the parent applications referred to above, and mixtures of such alcoholic solvents with nitroparaffins having not more than three carbon atoms.

It is thus seen that the invention is broad in scope, and is not to be limited except by the claims, in which it is intended to cover all novelty inherent in the invention as broadly as possible, in view of prior art.

Having thus disclosed our invention, we claim:

1. An article of polystyrene having a coating of a solid transparent synthetic resin, said coating containing an ultraviolet screening substance selected from the group consisting of phenyl salicylate, methyl salicylate and benzyl salicylate; said coating also containing a cellulose ester formed with an acid having from two to four carbon atoms and a cellulose ester containing at least 8% of acetyl groups.

2. An article of polystyrene having a coating of a solid transparent synthetic resin, said coating containing 5% to 50% of an ultraviolet screening substance selected from the group consisting of phenyl salicylate, methyl salicylate and benzyl salicylate; said coating also containing a cellulose ester formed with an acid having from two to four carbon atoms and a cellulose ester containing at least 8% of actyl groups.

3. An article of polystyrene having a solid coating of a transparent synthetic resin, said coating comprising 5% to 50% of phenyl salicylate; said coating also containing a cellulose ester formed with an acid having from two to four carbon atoms and a cellulose ester containing at least 8% of acetyl groups.

JOHAN BJORKSTEN.
LUTHER L. YAEGER.

REFERENCES CITED

The following references are of record in the file of this patent:

UNITED STATES PATENTS

| Number | Name | Date |
| --- | --- | --- |
| 1,319,229 | Lindsay | Oct. 21, 1919 |
| 2,157,068 | Carruthers et al. | May 2, 1939 |
| 2,292,393 | Mitchell | Aug. 11, 1942 |
| 2,332,461 | Muskat et al. | Oct. 19, 1943 |
| 2,360,367 | Ruben | Oct. 17, 1944 |
| 2,388,851 | Kenyon et al. | Nov. 13, 1945 |
| 2,407,051 | Adelson et al. | Sept. 3, 1946 |
| 2,428,453 | Feild | Oct. 7, 1947 |

FOREIGN PATENTS

| Number | Country | Date |
| --- | --- | --- |
| 489,725 | Great Britain | Aug. 3, 1938 |